Aug. 17, 1937.                P. MURRAY ET AL                2,090,403
                                BEER CONTAINER
                              Filed Aug. 27, 1935              2 Sheets-Sheet 1
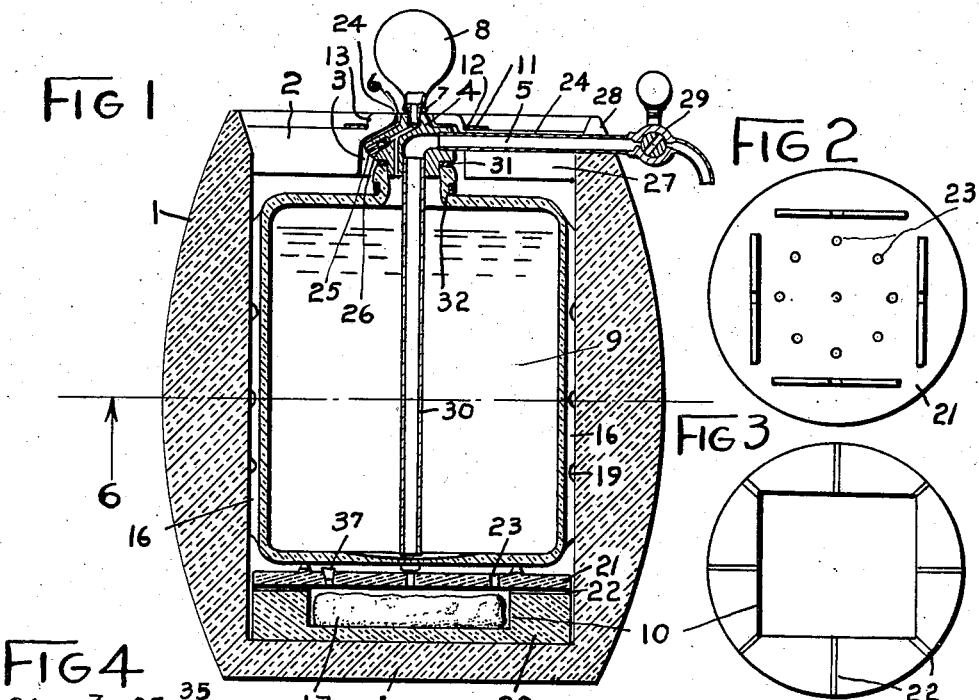
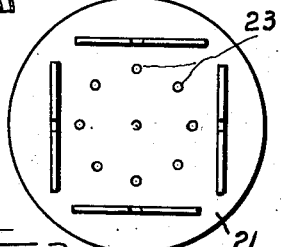
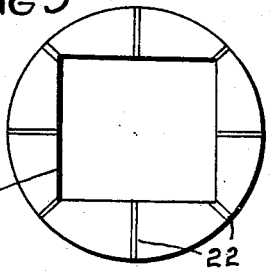
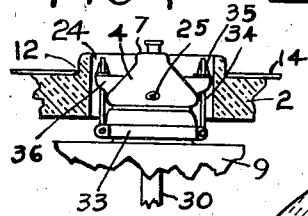
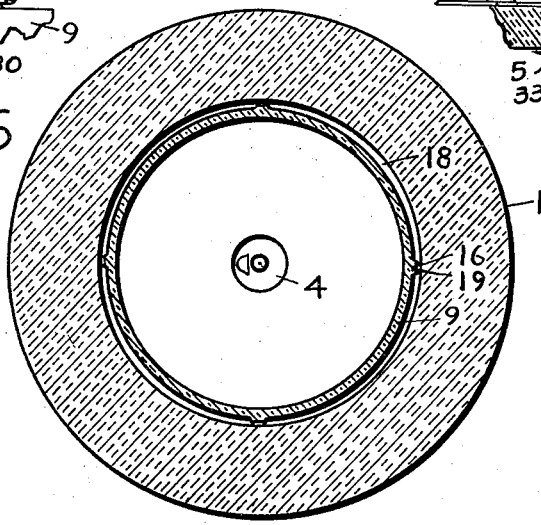
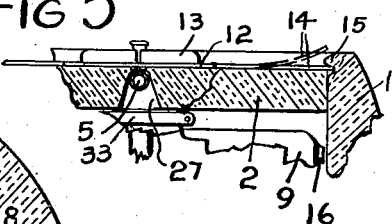
INVENTOR.
PAUL MURRAY & HILTON B. MURRAY.
BY
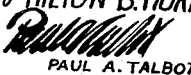
PAUL A. TALBOT.
ATTORNEYS.

Aug. 17, 1937.  P. MURRAY ET AL  2,090,403
BEER CONTAINER
Filed Aug. 27, 1935  2 Sheets-Sheet 2

INVENTOR.
PAUL MURRAY & HILTON B. MURRAY.
BY
PAUL A. TALBOT.
ATTORNEYS.

Patented Aug. 17, 1937

2,090,403

UNITED STATES PATENT OFFICE 2,090,403

BEER CONTAINER

Paul Murray and Hilton B. Murray,
New York, N. Y.

Application August 27, 1935, Serial No. 38,039

8 Claims. (Cl. 225—1)

Our invention relates to a container for maintaining the temperature, pressure and quality and to preserve draught beer and for such other liquids as require similar treatment. We are aware that beer has been shipped in various types and sizes of barrels and bottles and kept cool and delicious both in unpasteurized draft form and in pasteurized form in bottles and our inventions and improvements are particularly applicable to the preserving and the convenience of making available real draught beer in the home and such other places as have proved difficult to supply by the use of the usual keg, cooler, pump, tap, etc. because of the quantity consumed and the bulk and care of the conventional equipment.

Beer at its best is by our simple device made available in a gallon or more for gradual home consumption as and when wanted. Beer is thus delivered and maintained in its most delicious and convenient form.

Among the objects are:

To provide a receptacle for keeping draught beer in palatable condition.

To provide a means for regulating the cooling effect of dry ice.

To provide a simple means of retaining a uniform pressure on draught beer in a convenient container.

To provide an insulated receptacle for draught beer.

To provide a ventilating system to distribute a uniform cooling effect to maintain a uniform temperature on draught beer in a convenient container.

To provide a simple and convenient container and means for disassembling and assembling the parts for filling and emptying draught beer.

We accomplish these and other objects by the construction herein described and illustrated in the accompanying drawings in which;

Figure 1 is a vertical section of our device.

Figure 2 is a plan view of the cover of the dry ice chamber.

Figure 3 is a plan view of the dry ice chamber.

Figure 4 is a fragmentary view of the beer container and the top fitting.

Figure 5 is a fragmentary view of the upper portion of our device showing a means of securing the top cover.

Figure 6 is a transverse section at 6, Figure 1.

Similar reference characters refer to similar parts of our device throughout the following specifications and in the several views of the accompanying drawings forming a part hereof.

Figure 7:
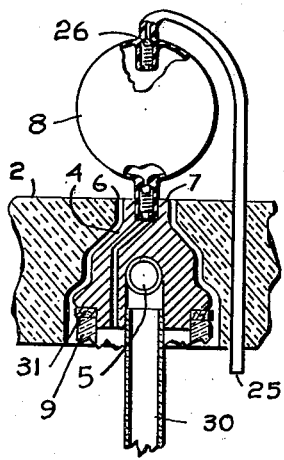
Figure 7 is a modification of the pressure bulb of our device.

Our device comprises an insulated outer housing (1) resembling preferably in shape and appearance a small beer keg. The upper end of the housing (1) is beveled to receive the insulated cover (2) which is recessed on its under surface at (3) to receive the top fitting (4) and the beer pipe (5). The cover (2) may be constructed in halves and may also be provided with a center opening (6) for the boss (7) of the top fitting (4) to receive the pressure bulb (8).

The housing (1) is preferably provided with the cylindrical center of a size and shape to permit the inner container (9) and dry ice compartment (10) to be freely inserted and removed. The cover (2), container (9) and compartment (10) are all held in place by the swingingly mounted spring piece (11) preferably having a center opening (12) to engage the center boss (13) of said cover (2). The extending yielding arms (14) may be pressed downwardly and swung under the bosses (15) which are positioned near the upper inner surface of the outer housing (1).

The inner container (9) is preferably provided with ribs (16) on its outer surface so constructed as to permit the flow of cool gas from the cake of dry ice (17). The spaces (18) formed between the ribs (16) are connected together at the bottom and top and between the ends by the notches (19).

The dry ice compartment (10) preferably comprises an insulated housing (20) having an external diameter suitable to freely enter the cylindrical inner surface of the outer housing (1) and together with the compartment cover (21) of like external diameter rest in the bottom of said housing. The size and shape of the ice compartment is so adjusted as to suit a standard cake of solid $CO_2$ which has been found to keep a given quantity of beer at the desired temperature for a definite period when our beer container is used in a room of average temperature. The cooling effect of the standard size cake of dry ice is further regulated by the number and size of the grooves (22) and apertures (23) permitting a greater or less discharge or circulation of the gases from the cake of dry ice.

As these gases are heavier than air and as their outlets (24) and (25) are at the top through the center of the cover (2) and into the inlet (25) of the pressure bulb (8) the circulation is slow and the cool effect very gradually applies to the outer surfaces of the inner container. The beer within the inner container is thus kept at the desired temperature by the cool gases slowly passing upwardly through the spaces between the ribs (16) as well as by the bottom and top of the inner container, the top fitting and beer pipe all of which are good conductors of heat and cold such as metal, glass, etc.

The pressure bulb (8) serves to maintain a constant pressure on the beer while being withdrawn from the inner container (9) by displacing the beer with gaseous $CO_2$; the inlet (25) to the suction valve (26) is located below the final outlet (24) for the gases.

The beer pipe (5) is preferably exposed to the cool carbon dioxide gases as it passes from the fitting (4) in recess (27) in the cover (2), preferably along the division line, when the cover is made in halves, thus permitting a small flow of gases around the beer pipe and through the crack between the two parts of the cover. A notch (28) is provided in the upper edge of the housing (1) to permit the beer pipe (5) and the inner container secured to it to be freely raised after disengaging the spring piece (11) from the bosses (15). The outer end of the beer pipes is provided with the usual tap (29) and the inner end to the center pipe (30) which is secured to the top fitting (4) at its upper end and projects downwardly close to the lowest point in the bottom of the container. As both the center pipes and the horizontal beer pipe are straight and short they are easily cleaned.

The top fitting is preferably held pressure tight against a gasket (31) between it and the top surface of the container (9) which is preferably the upper end of the fitting opening and neck, which also may be provided with an annulus (32) to receive the clamp band (33) to which are hingeably secured the clamp bolts (34) and their wing nuts (35) engaging the bifurcated lugs (36) of the top fitting (4).

The inner container may be of sheet metal or other material sufficiently low in cost to permit discarding after use or may be glass, porcelain or earthenware easily cleaned and not affected by long use.

The dry ice compartment as shown above the container in Figure 8 may be used for keeping beer under conditions where a relatively short period is required or a cooler temperature is desired.

The hose connection to the pressure bulb in Figure 7 shows a modification of a means of forcing the cold gas into the space above the beer in the container.

Plugs or corks (37) or other means may be used to vary the flow of gas from the ice compartment by closing some of the openings in its cover.

Figure 9:
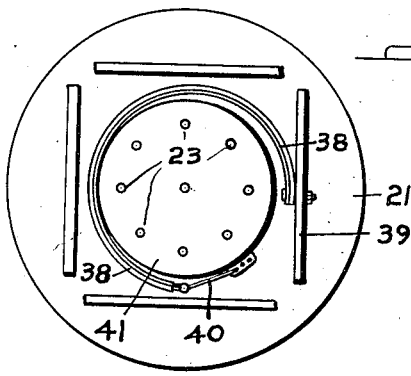
Figure 9 is a view of the temperature regulator.

Figure 9 illustrates the application of a bimetal thermostat (38) secured at one end to one of the ribs (39) of the compartment cover (21) and at its other end to the link (40) adjustably connecting the oscillating shutter (41) to open and close the apertures (23) which register with the apertures in the shutter when fully open. A thermostat may also be positioned in the beer pipe (5) to effect a movement by mechanical means the flow of the escaping gases from the dry ice. The flow of the gases is accomplished by the amount of exposure of the ice to the beer container as well as the kind and thickness of the insulation of the compartment cover (21).

Figure 8:
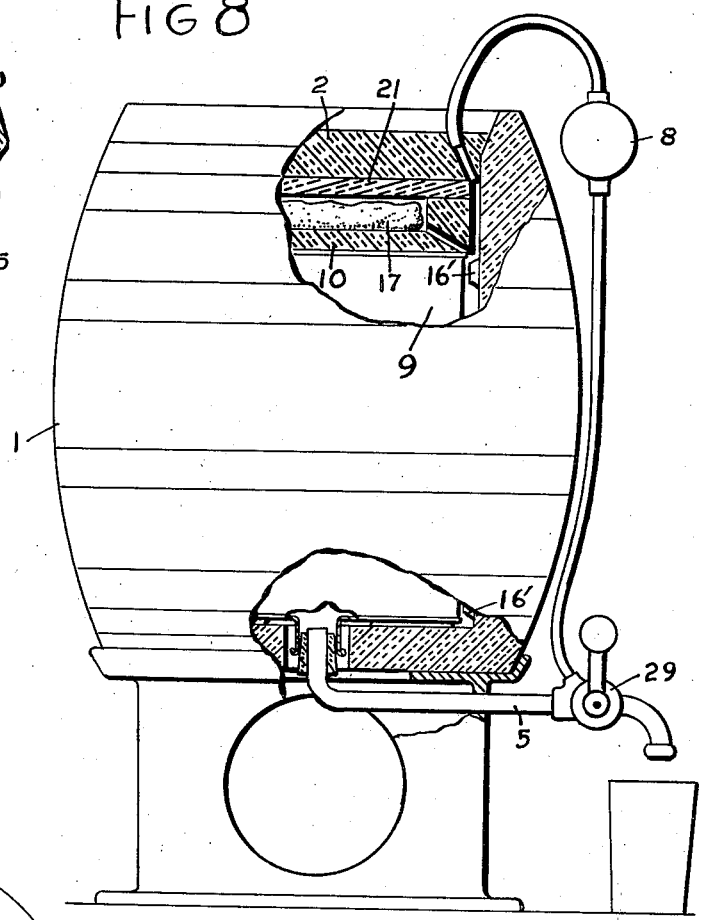
Figure 8 is a modification of the ice chamber and beer container.

In Figure 8 a pressure bulb somewhat similar to the one shown in Figure 7 is connected to the top gas space and discharges the gas into the beer pipe (5) which in this modification is arranged to draw the beer from the bottom of the container (9) which is shown as constructed of metal; a can which may be discarded after use. The gas flows through the beer pipe and upward through the beer to the space above it. The inner surface of the housing may be provided with the ribs (16') to hold the container at a distance from its walls to provide the desired space for the circulation of the cool gases.

By referring to Figure 1 it will be seen that the center pipe in discharging the beer from the bottom of the container delivers the coldest beer first as the dry ice and the gas leaving it first pass the bottom of the container before being heated by the container in passing by its sides and top. Thus, regardless of the quantity of beer in the container, the coldest beer will be first delivered to the tap.

While we have described in detail one of the preferred constructions of our device and have shown modifications in our drawings we do not wish to be limited to these details of construction as the numerous conditions of application of our beer container may obviously alter the construction within the scope of the appended claims which succinctly set forth our invention.

We claim:—

1. In an apparatus for dispensing beer, having an outer housing of insulating material, and a container for beer held away from the inner surface of said outer housing to form a passage for gases and a dry ice compartment connected through said passage to said container, a top fitting having a beer pipe and a cover detachably secured to said insulated housing provided with an outlet to permit the flow of cool gases by and beyond said fitting and beer pipe.

2. In an apparatus for dispensing beer, an outer housing of insulating material, a container for beer held away from the inner surface of said outer housing to form a passage for gases and a dry ice compartment connected to said gas spaces and partially insulated therefrom to regulate the cooling effect from the dry ice to the beer in said container, a top fitting and beer pipe and a cover detachably secured to said insulated housing provided with an outlet to permit the flow of cool gases by and beyond said fitting and beer pipe, a pressure bulb connected and adapted to force a pressure of carbon dioxide gas in the space above the beer in said container.

3. In an apparatus for dispensing beer, an outer housing of insulating material, a container for beer held away from the inner surface of said outer housing to form a passage for gases and a dry ice compartment connected to said gas spaces and partially insulated therefrom to regulate the cooling effect from the dry ice to the beer in said container, a top fitting and beer pipe and a cover detachably secured to said insulated housing provided with an outlet to permit the flow of cool gases by and beyond said fitting and beer pipe, a pressure bulb connected and adapted to force a pressure of carbon dioxide gas in the space above the beer in said container and a suction inlet to said bulb connected to the gas space above said container.

4. In a container for liquid, means for cooling said container comprising an insulated outer housing of a size internally to form a gas space between the container and said outer housing, an insulated dry ice chamber having outlets to said gas space and means for regulating the flow of cool gases from said dry ice chamber to said gas space between said housing and container for liquid and means for pumping the gas from said gas space into said container to produce a pressure of gases in the space above the liquid in said container.

5. In a container for liquid, a fitting clamped pressure tight to the top of said container, a center pipe projecting downwardly through and to a point near the bottom of the liquid and a beer pipe connected by said fitting to said center pipe and means for providing a pressure to the space above the liquid in said container through said fitting to maintain a pressure on and to force the liquid from said container and a tap on said beer pipe to regulate the flow of liquid therethrough and an insulated housing around said liquid container and a cover to said insulated housing having an opening around said fitting an above said beer pipe.

6. In a container for liquid, a fitting clamped pressure tight to the top of said container, a center pipe projecting downwardly through and to a point near the bottom of the liquid and a beer pipe connected by said fitting to said center pipe and means for providing a pressure to the space above the liquid in said container through said fitting to maintain a pressure on and to force the liquid from said container and a tap on said beer pipe to regulate the flow of liquid therethrough and an insulated housing around said liquid container and a cover to said insulated housing having an opening around said fitting and above said beer pipe and a dry ice compartment connected to the opening in said cover.

7. In a container for liquid, a fitting clamped pressure tight to the top of said container, a center pipe projecting downwardly through and to a point near the bottom of the liquid and a beer pipe connected by said fitting to said center pipe and means for providing a pressure to the space above the liquid in said container through said fitting to maintain a pressure on and to force the liquid from said container and a tap on said beer pipe to regulate the flow of liquid therethrough and an insulated housing around said liquid container and a cover to said insulated housing having an opening around said fitting and above said beer pipe and a dry ice compartment connected to the opening in said cover and means for regulating the flow of gases from the dry ice in said compartment by said container and through the opening in said cover.

8. In a container for liquid, means for cooling said container comprising an insulated outer housing of a size internally to form a gas space between the container and said outer housing, an insulated dry ice chamber having outlets to said gas space and means for regulating the flow of cool gases from said dry ice chamber to said gas space between said housing and container for liquid comprising a cover having a thermostat secured thereto.

PAUL MURRAY.
HILTON B. MURRAY.